United States Patent
Hazel et al.

(10) Patent No.: US 7,754,342 B2
(45) Date of Patent: *Jul. 13, 2010

(54) STRAIN TOLERANT CORROSION PROTECTING COATING AND SPRAY METHOD OF APPLICATION

(75) Inventors: Brian T. Hazel, West Chester, OH (US); Jane A. Murphy, Franklin, OH (US); Andrew J. Skoog, West Chester, OH (US); Bryan T. Bojanowski, Cincinnati, OH (US); Michael J. Weimer, Loveland, OH (US)

(73) Assignee: General Electric Company, Schenectady, NY (US)

( * ) Notice: Subject to any disclaimer, the term of this patent is extended or adjusted under 35 U.S.C. 154(b) by 616 days.

This patent is subject to a terminal disclaimer.

(21) Appl. No.: 11/311,720

(22) Filed: Dec. 19, 2005

(65) Prior Publication Data

US 2007/0141369 A1 Jun. 21, 2007

(51) Int. Cl.
  *B32B 15/04* (2006.01)
  *F03B 3/12* (2006.01)
(52) U.S. Cl. .................. 428/632; 428/548; 428/469; 428/701; 428/702; 416/241 B
(58) Field of Classification Search .................. None
  See application file for complete search history.

(56) References Cited

U.S. PATENT DOCUMENTS

| | | | |
|---|---|---|---|
| 4,080,311 A | 3/1978 | Kehl | |
| 4,659,613 A | 4/1987 | Mosser et al. | |
| 4,773,928 A * | 9/1988 | Houck et al. | .................. 75/342 |
| 5,202,175 A | 4/1993 | Paz-Pujalt | |
| 5,552,361 A | 9/1996 | Rieser et al. | |
| 5,626,923 A | 5/1997 | Fitzgibbons et al. | |
| 5,682,596 A | 10/1997 | Taylor et al. | |
| 5,985,454 A | 11/1999 | McMordie et al. | |
| 6,036,762 A | 3/2000 | Sambasivan | |
| 6,066,403 A | 5/2000 | Sherwood et al. | |
| 6,074,464 A | 6/2000 | Eddinger et al. | |
| 6,083,308 A | 7/2000 | Fletcher | |
| 6,177,186 B1 | 1/2001 | Skoog et al. | |
| 6,197,424 B1 | 3/2001 | Morrison et al. | |
| 6,210,791 B1 | 4/2001 | Skoog et al. | |
| 6,413,578 B1 * | 7/2002 | Stowell et al. | ............... 427/142 |
| 6,440,499 B1 * | 8/2002 | Wydra et al. | ............. 427/376.8 |

(Continued)

FOREIGN PATENT DOCUMENTS

EP  1586676  10/2005

(Continued)

*Primary Examiner*—Ling Xu
(74) *Attorney, Agent, or Firm*—McNees Wallace & Nurick LLC

(57) ABSTRACT

A corrosion resistant coating for gas turbine engine includes a glassy ceramic matrix wherein the glassy matrix is silica-based, and includes corrosion resistant particles selected from refractory particles and non-refractory MCrAlX particles, and combinations thereof. The corrosion resistant particles are substantially uniformly distributed within the matrix, and provide the coating with corrosion resistance. Importantly the coating of the present invention has a coefficient of thermal expansion (CTE) greater than that of alumina at engine operating temperatures. The CTE of the coating is sufficiently close to the substrate material such that the coating does not spall after frequent engine cycling at temperatures above 1200° F.

19 Claims, 8 Drawing Sheets

U.S. PATENT DOCUMENTS

| | | |
|---|---|---|
| 6,461,415 B1 | 10/2002 | Sambasivan et al. |
| 6,569,263 B2 | 5/2003 | Brown et al. |
| 6,827,969 B1 | 12/2004 | Skoog et al. |
| 6,926,496 B2 | 8/2005 | Ackermann et al. |
| 6,929,852 B2 | 8/2005 | Lane et al. |
| 7,314,674 B2 * | 1/2008 | Hazel et al. .................. 428/701 |
| 2005/0228098 A1 * | 10/2005 | Skoog et al. ................. 524/430 |
| 2007/0128447 A1 * | 6/2007 | Hazel et al. .................. 428/426 |

FOREIGN PATENT DOCUMENTS

| | | |
|---|---|---|
| GB | 2319248 | 5/1998 |
| WO | WO 97/08245 | 3/1997 |

* cited by examiner

FCT RESULTS
· 1400°F FCT ADHESION TESTING
  – SERMAFLOW – 100% EARLY SPALLATION AT ≥ 2.0mils
  – MODIFIED AJ-11 – <u>NO SPALLATION AT 2.0 mils</u>

SERMAFLOW N3000

1.2 mils      2.0 mils
EDGE CHIPS      SPALL

MODIFIED AJ-11 COATING 1.0 mils      2.0 mils
NO DAMAGE

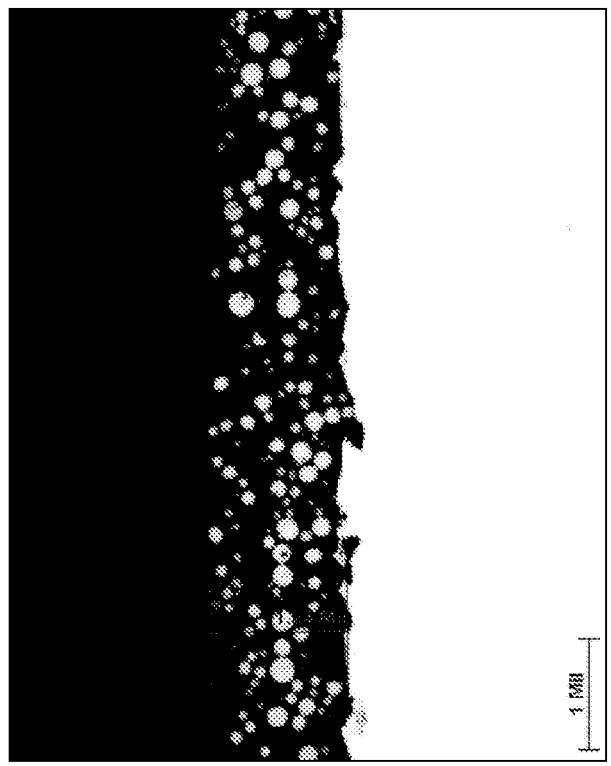
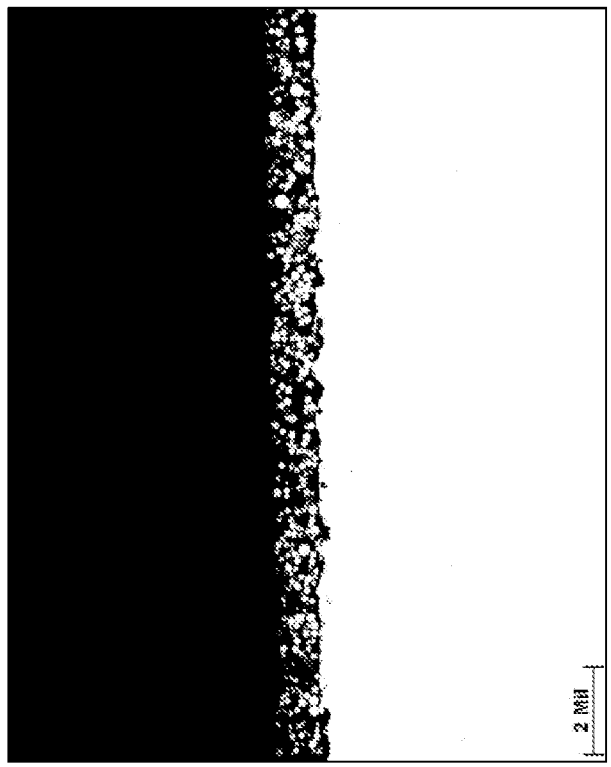
FIG. 10A
FIG. 10B
FIG. 10

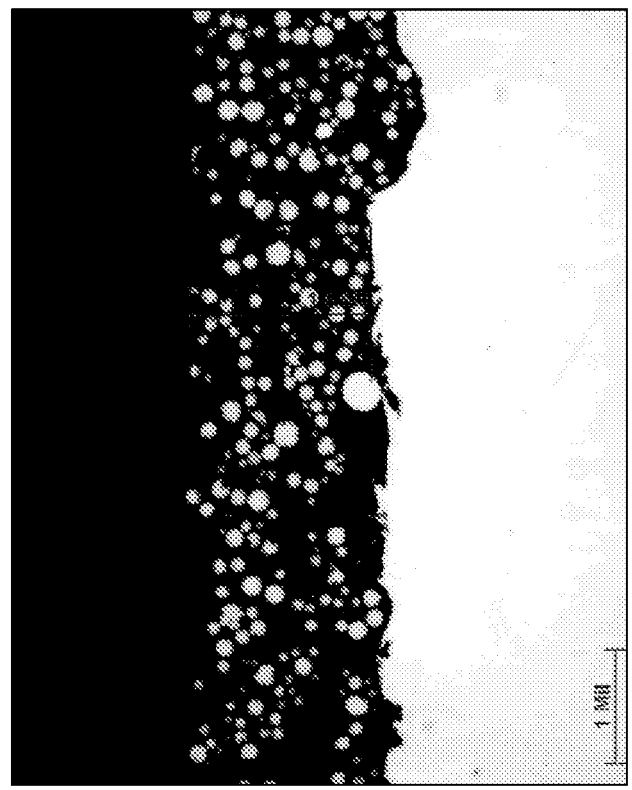
FIG. 11B
FIG. 11A
FIG. 11

STRAIN TOLERANT CORROSION PROTECTING COATING AND SPRAY METHOD OF APPLICATION

FIELD OF THE INVENTION

The present invention is directed to a corrosion resistant coating for use on non-gas flowpath turbine engine components subjected to moderate temperatures and corrosive environments, and to methods of applying the coating to turbine engine components.

BACKGROUND OF THE INVENTION

In the compressor portion of an aircraft gas turbine engine, atmospheric air is compressed to 10-25 times atmospheric pressure, and adiabatically heated to 800°-1250° F. in the process. This heated and compressed air is directed into a combustor, where it is mixed with fuel. The fuel is ignited, and the combustion process heats the gases to very high temperatures, in excess of 3000° F. These hot gases pass through the turbine, where rotating turbine wheels extract energy to drive the fan and compressor of the engine, and the exhaust system, where the gases supply thrust to propel the aircraft. To improve the efficiency of operation of the aircraft engine, combustion temperatures have been raised. Of course, as the combustion temperature is raised, steps must be taken to prevent degradation of engine components directly and indirectly as a result of the higher operating temperatures.

The requirements for enhanced performance continue to increase for newer engines and modifications of proven designs, as higher thrusts and better fuel economy are among the performance demands. To improve the performance of this engine, the combustion temperatures have been raised to very high temperatures. This can result in higher thrusts and/or better fuel economy. These combustion temperatures have become sufficiently high that even superalloy components not within the combustion path have been subject to degradation. These superalloy components have been subject to degradation by mechanisms not generally experienced previously, creating previously undisclosed problems that must be solved. One recent problem that has been discovered during refurbishment of high performance aircraft engines has been the pitting of turbine disks, seals and other components that are supplied with cooling air. The cooling air includes ingested particulates such as dirt, volcanic ash, fly ash, concrete dust, sand, sea salt as well as metal, sulfates, sulfites, chlorides, carbonates, various and sundry oxides and/or various salts in either particulate or gaseous form. These materials are deposited on substrate surfaces. When deposited on metallic surfaces, these materials can interact with one another and with the metallic surface to corrode the surface. Corrosion is accelerated at elevated temperatures. The materials used in turbine engines are typically selected on high temperature properties, including their ability to resist corrosion, even these materials will degrade under severe conditions at elevated temperatures. On investigation of the observed pitting problem, it has been discovered that the pitting is caused by a formation of a corrosion product as a result of the ambient airborne foreign particulate and gaseous matter that is deposited on the disks, seals or other components as a result of the flow of cooling air containing foreign particulate and gaseous matter. This deposition, along with the more elevated temperature regimes experienced by these engine components, has resulted in the formation of the corrosion products. It should be noted that the corrosion products are not the result of exposure of the engine components to the hot gases of combustion, normally associated with oxidation and corrosion products from contaminants in the fuel. The seals, turbine disks and other components under consideration and discussed herein generally are designed so that, if a leak is present, the air will leak in the direction of the flow of the hot gases of combustion and not in the direction of the components under consideration.

Because the corrosion products are the result of exposure of the engine components to cooling air drawn from ambient air environments, it is not uniform from engine to engine as aircraft visit different geographic locations with different and distinct atmospheric conditions. For example, some planes are exposed to salt water environments, while others may be subject to air pollutants from highly industrial regions. The result is that some components experience more advanced corrosion than other components.

The corrosion was not unanticipated. But the remedial efforts initiated during the production were ineffective. Various coatings have been suggested and attempted to mitigate corrosion concerns. One is a phosphate-based set forth in U.S. patent application Ser. No. 11/011695 entitled CORROSION RESISTANT COATING COMPOSITION, COATED TURBINE COMPONENT AND METHOD FOR COATING SAME filed on Dec. 15, 2004, assigned to the assignee of the present application and incorporated herein by reference. Others include aqueous corrosion resistant coating compositions comprising phosphate/chromate binder systems and aluminum/alumina particles. See, for example, U.S. Pat. No. 4,606,967 (Mosser), issued Aug. 19, 1986 (spheroidal aluminum particles); and U.S. Pat. No. 4,544,408 (Mosser et al), issued Oct. 1, 1985 (dispersible hydrated alumina particles). Corrosion resistant diffusion coatings can also be formed from aluminum or chromium, or from the respective oxides (i.e., alumina or chromia). See, for example, commonly assigned U.S. Pat. No. 5,368,888 (Rigney), issued Nov. 29, 1994 (aluminide diffusion coating); and commonly assigned U.S. Pat. No. 6,283,715 (Nagaraj et al), issued Sep. 4, 2001 (chromium diffusion coating). A number of corrosion-resistant coatings have also been specifically considered for use on turbine disk/shaft and seal elements. See, for example, U.S. Patent Application 2004/0013802 A1 (Ackerman et al), published Jan. 22, 2004 (metal-organic chemical vapor deposition of aluminum, silicon, tantalum, titanium or chromium oxide on turbine disks and seal elements to provide a protective coating). These prior corrosion resistant coatings can have a number of disadvantages, including: (1) possibly adversely affecting the fatigue life of the turbine disks/shafts and seal elements, especially when these prior coatings diffuse into the underlying metal substrate; (2) potential coefficient of thermal expansion (CTE) mismatches between the coating and the underlying metal substrate that can make the coating more prone to spalling; and (3) more complicated and expensive processes (e.g., chemical vapor deposition (CVD)) for applying the corrosion resistant coating to the metal substrate.

Still another problem is that a corrosion mitigation coating that has been applied to certain components has proven to be ineffective. This coating, an alumina pigment in a chromate-phosphate binder utilizing hexavalent chromium in a coating composition commercially marketed as SermaFlow® N3000, cracked after exposure to elevated temperatures. SermaFlow® is a registered trademark of Sermatech International of Pottstown, Pa., USA. Of course, that coating also has the disadvantage of including the environmentally unfriendly element, chromium, which presents challenges during application. Additionally, while such a coating is effective at low temperatures, it has a low coefficient of expansion so that at the higher temperatures experienced by newer engines, the coating, even when applied in thicknesses of as thin as 0.5-2.5 mils, cracked. In fact at thicknesses of 1.5 mils and greater, this coating delaminated after one engine cycle at 1300° F., a capable operating temperature for newer engines. While the problem described has been most evident on the newer high performance engines, because of the extremes dictated by its operation, the problem is not so restricted. As temperatures continue to increase for most aircraft engines as well as other gas turbine engines, the problem will also be experienced by these engines as they cross a temperature threshold related to the materials utilized in these engines.

What is needed is a coating composition that is free of hexavalent chromium that can be applied to prevent corrosion of turbine engine components even when the turbine engine components are subjected to elevated operating temperatures in a wide variety of atmospheres.

SUMMARY OF THE INVENTION

Turbine engine components for use at the highest operating temperatures are typically made of superalloys of iron, nickel, cobalt or combinations thereof or other corrosion resistant materials such as stainless steels selected for good elevated temperature toughness and fatigue resistance. Illustrative superalloys, all of which are well-known, are designated by such trade names as Inconel®, for example Inconel® 600, Inconel® 722 and Inconel® 718, Nimonic®, RENE® for example RENE® 88DT, RENE® 104, RENE® 95, RENE® 100, RENE® 80 and RENE® 77, and Udimet®, for example Udimet® 500, Hastelloy®, for example Hastelloy® X, HS 188 and other similar alloys known to those skilled in the art. Such superalloy materials have resistance to oxidation and corrosion damage, but that resistance is not sufficient to protect them at sustained operating temperatures now being reached in gas turbine engines. Engine components, such as disks and other rotor components, are made from newer generation alloys that contain lower levels of chromium, and can therefore be more susceptible to corrosion attack. These engine components include turbine disks, turbine seal elements turbine shafts, airfoils categorized as either rotating blades or stationary vanes, turbine blade retainers, center bodies, engine liners and flaps. This list is exemplary and not meant to be inclusive.

While all of the above listed components may find advantage for the present invention, engine components such as the turbine disks, turbine seal elements, turbine blade retainers and turbine shafts are not directly within the gas path of the products of combustion, and are not typically identified with corrosive products experienced as a result of exposure to these highly corrosive and oxidative gases. Nevertheless, these components have experienced higher operating temperatures and are experiencing greater corrosion effects as a result of these higher operating temperatures. The present invention is a corrosion resistant coating applied to these components to alleviate or minimize corrosion problems.

The corrosion-resistant coating composition of the present invention is a cost-effective alternative to known anti-corrosion coatings applied by more expensive methods. The present invention utilizes a novel coating composition that can be applied and fired to provide a corrosion resistant coating for engine components such as turbine disks, turbine seal elements, turbine blade retainers and turbine shafts. This coating may also find application to other turbine components that are subjected to high temperatures and corrosive environments, such as turbine components located within or on the boundary of the combustion gas fluid flow path, including for example turbine blades, turbine vanes, liners and exhaust flaps.

The corrosion resistant coating of the present invention in service on a gas turbine component includes a glassy ceramic matrix wherein the matrix is silica-based and includes corrosion-resistant particles selected from the group consisting of refractory particles and non-refractory particles and combinations thereof, substantially uniformly distributed within the matrix. The silicone binder forms a silica-based matrix as it glassifies around the corrosion resistant particles on curing, and at elevated temperatures of operation converts to a glassy ceramic. The corrosion-resistant particles provide the coating with corrosion resistance. Importantly the coating of the present invention has a coefficient of thermal expansion (CTE) that is equal to or greater than that of alumina. In a first embodiment wherein the refractory particles comprise a refractory oxide such as alumina, the particulate will have a CTE near that of the refractory oxide, and the resulting coating but must be relatively thin to avoid spalling.

In a second embodiment of the coating, the corrosion resistant particles include non-alumina corrosion resistant particulates such as MCrAlX having a CTE greater than that of alumina. In this embodiment, the coating can be relatively thick compare to the refractory-only embodiment, without compromising resistance to cracking or spalling. Preferably, the selection of corrosion resistant particles is made so that the CTE of the coating is sufficiently close to the substrate material so that the coating does not spall after frequent engine cycling at elevated temperatures.

The coating of the present invention results from application of a coating composition to an article. The coating composition of the present invention is applied to a high temperature turbine engine component that requires corrosion protection. As used herein, a high temperature turbine engine component is one that cycles through a temperature of at least about 1100° F., such as a turbine disk, seal, blade retainer or turbine shaft. The coating composition of the present invention includes a mixture of corrosion-resistant particles and a silicone binder, the mixture suspended in a carrier liquid such as an organic solvent. The corrosion-resistant particles are selected from the group consisting of refractory particles and non-refractory particles. The refractory particles preferably comprise at least one of a refractory oxide such as alumina and non-alumina refractory particulate.

In a first embodiment, the corrosion-resistant particles are refractory particles. The refractory particles are selected to be more corrosion resistant than the substrate. Although alumina is a suitable refractory material, preferably other refractory materials having a CTE higher than alumina (alumina has a CTE of about $4 \times 10^{-6}$ in/in/F at 1300° F.) are provided. Examples of such particulate materials include zironcia, hafnia, stabilized zirconia and hafnia (e.g. yttria stabilized), ceria, chromia, magnesia, iron oxide, titania, yttria, and yttrium aluminum garnet (YAG), for example. The refractory particles are preferably provided in at least two particle sizes to increase density of the cured coating.

In a second embodiment, the corrosion-resistant particles are selected from the group consisting of refractory particles and non-refractory particles. Exemplary non-refractory particles include MCr, MAl, MCrX, MAlX and MCrAlX particles, where M is an element selected from iron, nickel, cobalt and combinations thereof and X is an element selected from the group of gamma prime formers, and solid solution strengtheners, consisting of, for example, Ta, Re or reactive elements, such as Y, Zr, Hf, Si, La or grain boundary strengtheners consisting of B, and C and combinations thereof. The non-refractory particles have a greater CTE than that of alumina. Preferably, the non-refractory particles have a CTE that is near the CTE of the underlying substrate at preselected temperatures such as those above about 1200° F. Providing more than a single particle size distribution reduces cracking and provides a higher density to the coating composition and to the resulting coating, as generally described, for example in commonly owned U.S. Pat. Nos. 4,617,056 and 6,544,351, which are incorporated herein by reference in their entirety.

Methods are provided for preparation of each embodiment of the coating composition, wherein a homogeneous coating composition is provided by mixing all components to form a slurry coating composition that can be applied to at least a portion of the surface of a component of a turbine engine. Mixing should coat the particles substantially uniformly with the solvent and silicone-based binder. Of course, the viscosity of the slurry coating composition can be adjusted consistent with the method of application of the coating to the component surface, whether by spraying or brushing.

Methods are also provided for applying a corrosion resistant coating to an article. Before the coating composition is applied to the surface of the component, the surface of the component is treated to enhance its adhesion. Depending on the surface, this preparation may be a mere cleaning of the surface, or it may additionally include a chemical etch or a mechanical roughening. Preferably, the method includes both chemical cleaning and mechanical roughening, such as solvent cleaning followed by grit blast. After cleaning and roughening, the slurry coating composition is applied to at least a portion of the surface of the component, and is allowed to dry. Drying is typically accomplished in two steps. In the first low temperature step, drying is accomplished to remove unbound fluid from the slurry and form a coating of preselected thickness on at least a portion of the surface of the component. Additional drying may be required to remove any remaining bound fluid, or trapped fluid, from the coating slurry and to initially cure the composition to form a partially cured coating on the surface, thereby forming a chemical and/or mechanical bond with the surface. After drying, the partially cured coating is fired to a preselected temperature to form at least a glassy matrix having uniformly distributed particles. Ideally, the coating is fired to a temperature that is equal to or less than the temperature that the component surface is expected to experience in operation. Due to the nature of the engine components herein being coated, the firing temperature must be equal to or less than the operating temperature, otherwise the parts will undergo residual stress relaxation that will distort their dimensions. For example, firing the coating at 1000° F. is appropriate when the operating temperature is expected to be about 1300° F.

An advantage of the present invention is that it can be used to provide corrosion resistance to engine components that experience cyclic temperatures in excess of 1100° F. without the presence of hexavalent chromium in the coating composition. Furthermore, the coating of the present invention has the ability to survive in applications that experience temperatures as high as 2100° F.

A very important advantage of the present invention is that it can be applied as a solvent-based material using an environmentally safe carrier liquid such as an alcohol.

Another advantage of the coating of the present invention is that chromates, such as used in known phosphate-based coatings, are eliminated.

Another advantage of the corrosion-resistant coating of the present invention is that it has a coefficient of thermal expansion that is compatible with many alloys used for turbine engine articles. Thus, the coating is not prone to spalling as a result of thermal cycling resulting from large temperature changes during aircraft engine operation.

Still another advantage of the coating of the present invention is that the coefficient of thermal expansion can be varied by varying the amount and selection of refractory particles and non-refractory particles and combinations thereof so that the coefficient of thermal expansion can be modified to match or approach most substrates used in aircraft engines, thereby reducing thermal stresses between the substrate and the coating. As a result, coating failure should not result from thermal cycling.

A related advantage is that the coating can be applied as multiple layers, with each layer having a different loading of refractory and non-refractory particles, combinations thereof so that each layer has a different coefficient of thermal expansion. By applying the coating as multiple layers in this manner, the interlayer stresses can be carefully controlled so that they are below the strain tolerance limit for the layers, again eliminating as a failure mechanism spallation due to thermal cycling.

Yet another advantage of the present invention is that it can be diluted or thickened as required for a preselected method of application, can be dried without curing, and can be partially cured without forming the thermoset bonds that define the glassy-ceramic final coating. This allows a variety of methods of application to a substrate, making the material very useful. Additionally, by varying the method of application, the overall strength of the layer or strength between multiple layers can be varied, making the material very versatile.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIGS. 10a and 10b depict cross-sectional photomicrograph views of the coupon of FIG. 9b, showing particle size distribution and coating thickness of the corrosion resistant particulates.

FIGS. 11a and 11b depict cross-sectional photomicrograph views of the coupon of FIG. 9c, showing particle size distribution and coating thickness of the corrosion resistant particulates.

DETAILED DESCRIPTION OF THE INVENTION

Figure 1:
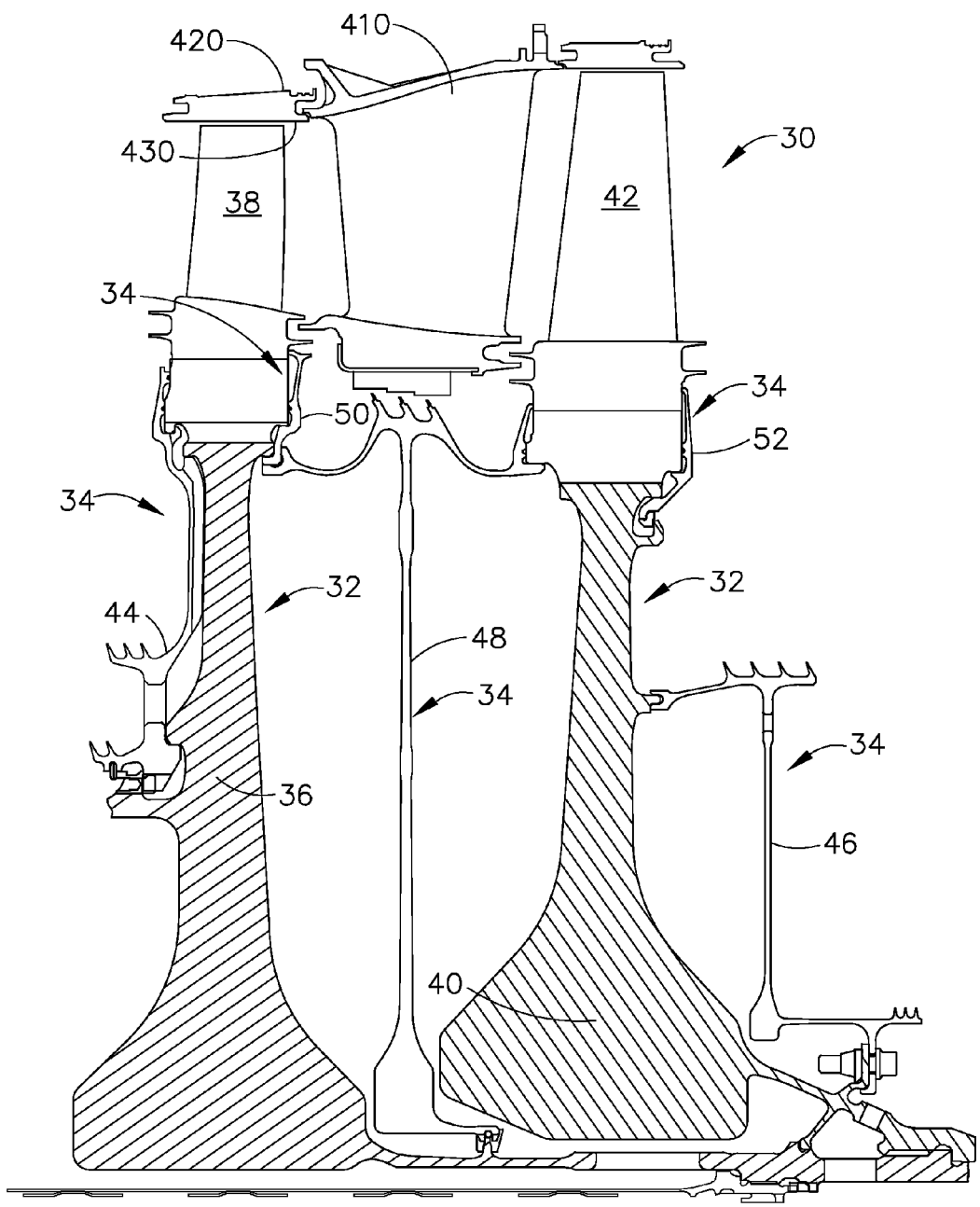
FIG. 1 is a cross-sectional view of a portion of the turbine section of a gas turbine engine.

The present invention is a coating composition that can be cured to form a corrosion resistant coating when applied over a turbine engine component or similar substrate. The composition includes a carrier liquid, a silicone binder, and corrosion-resistant particles selected from the group consisting of refractory particles and non-refractory particles. The corrosion-resistant particles provide the coating with the key corrosion resistance, while the silicon-based material is the binder during application and forms the matrix after curing. The corrosion resistant particles are substantially uniformly distributed in a silicon-based binder and carrier liquid to form a sprayable coating composition. On curing, the silicone binder forms a glassy silicate matrix, which upon firing, may convert at least partially to a glassy ceramic matrix.

In a first embodiment, the corrosion resistant particles are refractory particles such as alumina, zironcia, hafnia, stabilized zirconia and hafnia (e.g. yttria stabilized), ceria, chromia, magnesia, iron oxide, titania, yttria, and yttrium aluminum garnet (YAG), for example.

In a second embodiment, the corrosion resistant particles include refractory particles and at least one non-refractory particulate material having a CTE that is greater than alumina. Exemplary non-refractory materials include MAl, MAlX, MCr, MCrX, MCrAlX particles, or combinations thereof, where M is an element selected from iron, nickel, cobalt and combinations thereof and X is an element selected from the group of gamma prime formers, and solid solution strengtheners, consisting of, for example, Ta, Re or reactive elements, such as Y, Zr, Hf, Si, La or grain boundary strengtheners consisting of B, and C. Preferably, the non-refractory particles have a CTE that approximates the CTE of the underlying substrate.

As used herein, the term "corrosion resistant coating" refers to coatings that, after curing and firing of the deposited corrosion resistant coating composition of this invention, comprise at least one layer overlying the metal substrate having an amorphous, glassy matrix or glassy-ceramic matrix and having embedded therein, encapsulated therein, enclosed thereby, or otherwise adhered thereto, particles from the corrosion resistant particle component. Corrosion resistant coatings of this invention can provide resistance against corrosion caused by various corrodants, including metal (e.g., alkaline) sulfates, sulfites, chlorides, carbonates, oxides, and other corrodant salt deposits resulting from ingested dirt, volcanic ash, fly ash, concrete dust, sand, sea salt, etc., at temperatures as high as 2100° F. (1150° C.) and lower, although the components that the coating of the present invention operate typically reach temperatures of about 1500° F. (815° C.). It is also possible to modify the coating composition by addition of elements to form a silicate-based ceramic coating upon firing, the coating having temperature capabilities in excess of 2100° F.

As noted above, because of the versatility of the coating, allowing it to be applied by different methods, the corrosion resistant coatings of this invention can be applied to thicknesses consistent with required engineering requirements as a monolithic layer, or can comprise a plurality of discrete layer(s) overlying the metal substrate. The particles are bound in the matrix, which may be glassy or glassy-ceramic depending upon the firing temperature. Typically, if desired, a glassy top coat can be applied over the corrosion resistant layer. The top coat can be applied for any number of reasons, for cosmetic purposes, for sealing, to provide anti-stick properties so that corrosion byproducts do not adhere to the component or for surface roughness improvements. A silicate glass or phosphate ($AlPO_4$ or $MgPO_4$) glass top coat is preferred, such as those commercially available phosphate top coats marketed by Sermatech International of Pottstown, Pa. under the trade names SermaSeal 565, SermaSeal 570A and by Coatings for Industry of Souderton, Pa. under the trade name Alseal 598.

FIG. 1 is a cross-sectional view depicting a portion of the turbine section of a gas turbine engine along the centerline of the engine. The turbine section 30 is a two stage turbine, although any number of stages may be employed depending on the turbine design. The present invention is not limited by the number of stages in the turbine. Turbine disks 32 are mounted on a shaft (not shown) extending through a bore in disks 32 along the centerline of the engine. A first stage blade 38 is attached to first stage disk 36, while second stage blade 42 is attached to second stage disk 40. A vane 410 extends from a casing 420. The inner surface of casing 420 forms a liner 430 for the hot gases of combustion, which flow in the gas flow path. The first stage blade 38, the second stage blade 42 and the vane 410 extend into the hot gas flow path. The vane is stationary and serves to direct the hot gas flow while blades 38, 42 mounted on disks 36, 40 rotate as the hot gases impinge on them, extracting energy to operate the engine.

Sealing elements 34, a forward seal 44, an aft seal 46, an interstage seal 48, a stage 1 aft blade retainer 50 and a stage 2 aft blade retainer 52, serve to seal and complete the compressor air cooling circuits to the turbine blades and nozzles. These seals are attached to the disks and rotate with the disks. Interstage seal 48 is positioned inboard of vane 410 and between the first stage disk 36 and the second stage disk 40. Also shown are optional blade retainers 50, 52 which lock the blades to the disks. The design of such retainers will vary dependent on engine design, with some engine designs not requiring them.

These disks, seals and blade retainers are heated to the temperatures of the cooling circuit air they direct. In addition, the parts closest to the combustion path are also heated by conductive heat transfer from the combustion path parts. For example, the rims of the turbine disks are conductively heated by the turbine blades. Contaminants in the cooling air, as previously discussed, deposit on the surfaces of the disks, seals and retainers that include the cooling cavities that provide the air that is the source of contamination at these elevated temperatures. Thus, the present invention can provide protection to any of these surfaces that are subject to corrosion due to deposition or accumulation of the cooling air contaminants.

Figure 3:
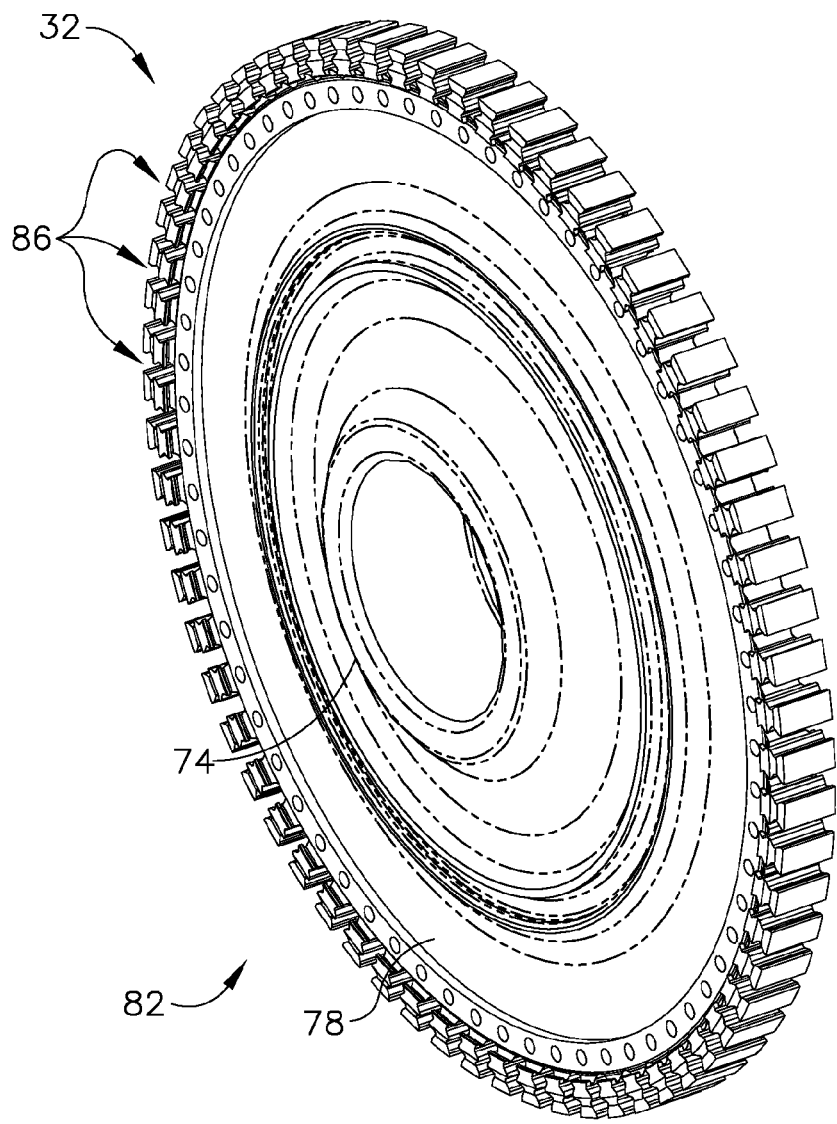
FIG. 3 is a perspective view of a turbine disk, as viewed from the front or fan portion of the engine in the direction of gas flow, showing where the corrosion resistant coating of this invention can be desirably located.

FIG. 3 is a perspective view of a typical gas turbine engine disk 82 such as disk 36 or 40 of FIG. 1, which is typically made of a superalloy material, such as one of the superalloy materials previously discussed. The disk 82 includes a hub 74 along typically the engine centerline that includes a bore through which a shaft (not shown) extends. The disk includes dovetail slots 86 along the disk outer periphery into which the turbine blades are inserted. A web section 78 of the disk 82 extends between the outer periphery, where the dovetail slots are located, and the hub. While the present invention may be utilized anywhere along disk 82, including the dovetail slots, it finds particular use along the surfaces of web section 78 and the dovetail slots 86, which unlike the hub 74, is directly exposed to cooling air.

Figure 2:
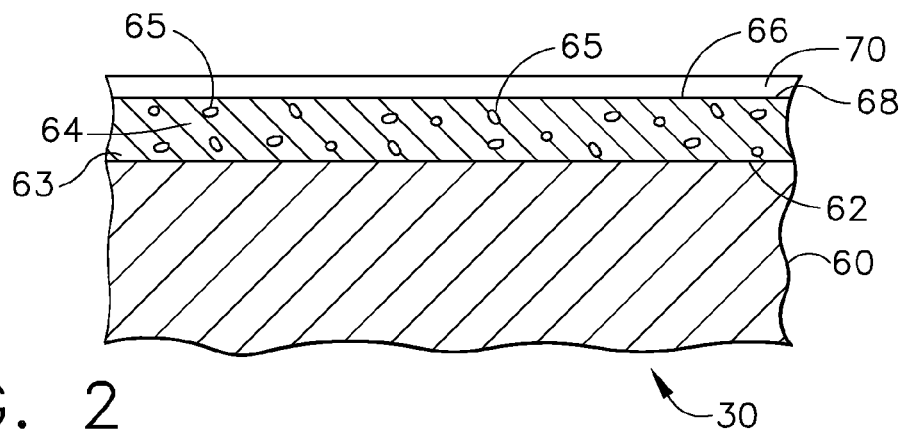
FIG. 2 is a cross-sectional view of a superalloy substrate having a surface coated with the coating of the present invention.

FIG. 2 depicts, in cross-section, the coating 64 of the present invention in its simplest form, deposited on an engine component. Corrosion resistant coating 64 is deposited on the surface 62 of substrate 60. The substrate 60 may be a turbine engine disk such as first stage disk 36 or second stage disk 40. The substrate 60 may be a typical surface such as web section 78 of a turbine disk 82. In accordance with the present invention, substrate 60 comprising superalloy based on nickel, cobalt, iron and combinations thereof, has deposited thereon a coating 64 of the present invention. Optionally, an undercoating may be provided (not shown), such as a McrAlX coating, for example a NiCrAlY or a CoNiCrAlY an aluminide such as NiAl or noble metal-modified aluminide such as (Pt,Ni)Al. As discussed previously, coating 64 can be cured as a single layer of graded coating and surface 66 is exposed to the cooling air forming the environment for the surface. Alternatively coating 64 may be of substantially uniform composition. If the coating is to be graded, then additional layers 68 are applied over coating layer 64, the first layer being applied over outer surface 66 and additional layers 68 being applied over subsequent outer coating layers.

Prior to forming the corrosion resistant coating 64 of this invention on the surface 62 of metal substrate 60, metal surface 62 is typically pretreated mechanically, chemically or both to make the surface more receptive for coating 64. Suitable pretreatment methods include grit blasting, with or without masking of surfaces that are not to be subjected to grit blasting (see U.S. Pat. No. 5,723,078 to Nagaraj et al, issued Mar. 3, 1998, especially col. 4, lines 46-66, which is incorporated by reference), micromachining, laser etching (see U.S. Pat. No. 5,723,078 to Nagaraj et al, issued Mar. 3, 1998, especially col. 4, line 67 to col. 5, line 3 and 14-17, which is incorporated by reference), treatment with chemical etchants such as those containing hydrochloric acid, hydrofluoric acid, nitric acid, ammonium bifluorides and mixtures thereof, (see, for example, U.S. Pat. No. 5,723,078 to Nagaraj et al, issued Mar. 3, 1998, especially col. 5, lines 3-10; U.S. Pat. No. 4,563,239 to Adinolfi et al, issued Jan. 7, 1986, especially col. 2, line 67 to col. 3, line 7; U.S. Pat. No. 4,353,780 to Fishter et al, issued Oct. 12, 1982, especially col. 1, lines 50-58; and U.S. Pat. No. 4,411,730 to Fishter et al, issued Oct. 25, 1983, especially col. 2, lines 40-51, all of which are incorporated by reference), treatment with water under pressure (i.e., water jet treatment), with or without loading with abrasive particles, as well as various combinations of these methods. Typically, the surface 62 of metal substrate 60 is pretreated by grit blasting where surface 62 is subjected to the abrasive action of silicon carbide particles, steel particles, alumina particles or other types of abrasive particles. These particles used in grit blasting are typically alumina particles and typically have a particle size of from about 600 to about 35 mesh (from about 25 to about 500 micrometers), more typically from about 360 to about 35 mesh (from about 35 to about 500 micrometers).

When additional layers 68 of coating are to be applied over surface 66 in order to obtain a graded, multi-layer coating, it is generally not necessary to prepare coating surface 66 prior to application of additional layers 68. The present invention is spray applied as a coating in thicknesses of from about 0.0001" (0.1 mils) to about 0.005" (5 mils), and preferably in thicknesses from about 0.0005" (0.5 mils) to about 0.0025" (2.5 mils). The coating can be applied to such thicknesses as a single layer, or can be applied as a plurality of distinct layers to achieve an overall thickness in these ranges.

The coating composition is applied and dried and cured to form a silica-based matrix having corrosion resistant particles substantially uniformly dispersed throughout. Corrosion resistance is provided by the corrosion resistant particles comprising refractory particles (designated "RP") such as refractory oxides and nitrides, and non-refractory particles (designated "NRP") such as MAl, MAlX, MCr, MCrX, MCrAlX, and combinations of these particles. Therefore, an embodiment having both RP and NRP is consistent with the second embodiment of the present invention having both refractory and non-refractory corrosion resistant particles.

The silica-based matrix can be formulated in any one of a number of ways. For example, a solvent based system utilizes a silicone binder material that is mixed with a solvent (also referred to herein as a liquid carrier). A typical silicone binder material is SR-350 available from General Electric Silicones. An alternate silicone binder material is SR-355 available from General Electric Company, Wilton, Conn. SR350 and SR355 are understood to be methylsesquisiloxane mixtures of the polysiloxane family in amounts of up to about 45 weight percent of the binder composition. The solvent, typically an evaporable organic solvent, such as an alcohol (methanol, ethanol, propanol etc), acetone or other suitable solvent is mixed to obtain a viscosity consistent with the preferred method of application, as will be discussed. Next, the corrosion resistant particles are added to the solvent and silicone material solution. These particles may include refractory particles that can impart corrosion resistance to a coating such as, for example, alumina, yttrium oxide ($Y_2O_5$), zirconium oxide ($Zr_2O_3$), titanium oxide ($TiO_2$), zirconia, hafnia, stabilized zirconia or hafnia (e.g. yttria stabilized or stabilized by other oxides—rare earths, magnesia, calcia, scandia), ceria ($CeO_2$), chromia ($Cr_2O_3$), iron oxide ($Fe_2O_3$, $Fe_3O_4$), titania ($TiO_2$), yttria ($Y_2O_3$), YAG ($Y_3Al_5O_{12}$), magnesia (MgO), and combinations thereof. The selected refractory material must fit the following two criteria to be acceptable: 1) the particle must have a CTE equal to or higher than alumina (alumina has a CTE of about $4 \times 10^{-6}$ to about $5 \times 10^{-6}$ in/in/F at 1200° F.); and, 2) must be more corrosion resistant than the substrate, preferably substantially inert to corrosion. To prepare the coating composition of the second embodiment, non-refractory particles are next added. As previously described, exemplary non-refractory particles include MAl, MAlX, MCr, MCrX, and MCrAlX, and combinations thereof. After the corrosion resistant particles have been added to the solution to form a slurry, the slurry viscosity is adjusted by either adding or removing solvent to the mixture to yield a composition viscosity that is consistent with the intended method of application. If the slurry is to be sprayed, the viscosity should be adjusted to be very low, whereas if the slurry is to be applied as a paste, using for example a doctor blade to adjust the thickness, then liquid should be removed so that the slurry does not flow readily. Additionally, surfactants and dispersants may optionally be added to the slurry when required. The selection and amount of corrosion resistant particles, binder, and solvent provide a coating composition that can be applied and cured to provide a corrosion resistant coating layer having a predetermined CTE.

In either embodiment of the coating composition, the corrosion resistant particles are added to the solvent and silicone so that the particles comprise from up to about 92% of the total solution by weight, the balance being the binder and solvent to render a sprayable composition. In the first embodiment of the coating composition, the slurry contains by weight from about 5% to about 45% binder, from about 3% to about 50% solvent and from about 15% to about 92% refractory particles by weight. In the second embodiment of the coating composition, the slurry contains by weight from about 5% to about 45% binder, from about 3% to about 50% solvent, from about 10% to about 87% non-refractory particles and from about 5% to about 82% refractory particles by weight.

In either embodiment, the corrosion resistant particles are provided in a size range of 25 microns and smaller. Preferably the particles are 10 microns and smaller in size. The particles may be substantially equiaxed (spherical) or non-equiaxed (flake). If a high particle density is desired, the particles should be provided in at least two sizes. In such a circumstance, the average particle size preferably should differ by a factor of about 7 to 10. The size difference between the particles allows the smaller particles to fill the areas between the larger particles. This is particularly evident when the particles are substantially equiaxed. Thus, if high packing density is required and the size of particles is about 5 microns, then a second size range of particles should also be included wherein the particles are 0.5 microns and smaller.

Regardless of the intended method of application, the coating composition mixture is thoroughly agitated. Agitation can be accomplished by any convenient method for about 0.1-5 hours. Preferably, mixing is accomplished for a period of about 0.1-0.5 hours. This is an important step, for it is not only important that the particles be substantially uniformly and thoroughly distributed throughout the slurry, it is also important that the solution completely "wet" or coat the particles. Depending on the particles, it is believed that the surfaces of the particles may become hydrolyzed, which, as will be discussed, will allow bonding with the silica-based material.

In a preferred embodiment, the viscosity is adjusted so that the slurry can be applied by spraying. In this circumstance, the slurry is continuously agitated by placing a stirrer into mix until it is ready for application. Even as the slurry is sprayed, the slurry can be pneumatically agitated by using a stirring pot in the spray application. The slurry is preferably applied by using a Paasch spray gun having an adjustable orifice. The orifice size must be larger than the largest particles in the slurry. The slurry is preferably sprayed at a pressure of about 20-60 psi. The coating composition is applied to a preselected thickness, with a larger orifice being selected when a thicker coating is desired.

After the coating composition mixture is applied to the surface of the component, the applied composition is allowed to dry. Drying is accomplished in two steps. In the first step, drying is accomplished to remove unbound solvent. This is accomplished after application of the composition to the surface of the component by raising the temperature to less than 212° F. (100° C.). It will be recognized by those skilled in the art that higher humidities and/or lower temperatures will also provide drying, but will require longer times to achieve the necessary drying. When the coating is applied to a thickness of about 0.001" (one mil) or greater, heating must be accomplished at a rate of no greater than about 2-10° F./min. to prevent blistering. Next, the coating is heated to a temperature of about 400° F. to drive off water and initiate a cure of the material.

After the initial cure, the coated substrate is fired to an elevated temperature to convert the coating into a glass or a glassy ceramic with substantially uniformly dispersed particles throughout. Preferably, firing is accomplished at a temperature at or above the expected operating temperature of the component, but not less than about 700° F. The coating may be fired up to about 2100° F. The higher the firing temperature, the higher percentage of the glass that is converted from glass to ceramic.

A graded coating may be achieved by applying additional layers over the first layer and subsequent layers, each subsequent layer applied after drying to remove unbound water and optionally fired to cure the layer. Of course, each layer is adjusted to have a different loading of particles and or particles of different compositions, the loading and type of particles determining the CTE of the layer. If the graded coating is applied in this manner and without firing between layers, there may be some mixing of the loadings at the interface between layers. On curing, there will be strong chemical bonding between the layers, and except for the loadings, the "layer" aspect will disappear and the coating will act as a uniform coating. Since the CTE can be tailored with thickness, the resulting stresses and strains can be designed as a function of coating thickness. This permits, if desired, the use of a highly corrosion resistant, low CTE particle such as alumina, in a coating layer, which layer can be applied over a higher CTE coating layer, such as a layer that includes CoNiCrAlY particles without negatively affecting the adhesion of the coating to the substrate. Optionally, additional mixed layers of the coating composition may be applied as overcoats to transition from high CTE at the substrate to lower CTE at the surface of the coated article. Where additional layers are applied over the first layer and subsequent layers, each subsequent layer is applied after drying to remove bound water and curing, and optionally firing. Again, each layer is adjusted to have a different loading of particles, the loading of particles determining the CTE of the layer. For example, adjusting the ratio of refractory particles such as alumina and non-refractory particles such as CoNiCrAlY will alter the CTE of a given coating layer. When the graded coating is applied in this manner, there is substantially no mixing of the loadings at the interface between layers and the layers are distinct. Where one or more layers are optionally fired before applying an overcoat layer, it is expected that the resulting discrete layers will not be crosslinked, and will therefore permit the multi-layer coating to incur spalling in an outer layer without incurring damage to undercoat layers.

EXAMPLES AND TESTING

The formulations shown herein are exemplary, and are not limiting. The goal is to provide a coating composition that can be applied to a substrate, and that will cure to form a thin silica-ceramic matrix coating that will protect the substrate from corrosion without using a formulation that contains hexavalent chromium.

The first example, shown in Table 1, shows an exemplary coating in accordance with the first embodiment of the present invention having only refractory corrosion resistant particulates. The second example, shown in Table 2, demonstrates a coating composition in accordance with the second embodiment of the present invention that includes both refractory and non-refractory corrosion resistant particles to yield a coating having a CTE that is compatible with the underlying substrate, thereby further reducing the tendency of the coating to spall when subjected to the operational heating and cooling cycles of a gas turbine engine.

TABLE 1

Example of First Embodiment (Refractory only)
Sprayed Materials for Corrosion
Protection by Weight Percent

| Material | Mod #3-4 |
|---|---|
| SM8 | 33-40 |
| A17SG | 45-55 |
| SR350 | 25-35 |
| Ethyl 95%-Isop 5% | 40-60 |

TABLE 2

Example of Second Embodiment (Refractory plus Non-refractory)
Sprayed Materials for Corrosion
Protection by Weight Percent

| Material | Mod #8-18 |
|---|---|
| Fe-125 | 60-80 |
| SM8 | 15-25 |
| SR350 | 25-35 |
| Ethyl 95%-Isop 5% | 40-60 |

Refractory only corrosion resistant particulates. In the exemplary coating composition of Table 1, consistent with a first embodiment of the coating composition, the corrosion resistant particulates comprise only refractory particles, in this case SM8 alumina and A17SG alumina. However, other refractory particles may be utilized, and preferably are provided in at least two particle size ranges, as further described herein.

Refractory Plus Non-Refractory corrosion resistant particulates. In the exemplary coating composition of Table 2, consistent with a second embodiment of the preset invention, the corrosion resistant particulates comprise both refractory and non-refractory particles. In this example, the non-refractory particulate is FeAl, an iron-based alloy comprising Fe and having about 10 weight percent aluminum. An exemplary FeAl is produced by Praxair Surface Technologies and is designated as Fe-125. Fe-125 is reported to have an average particle size of less than about 27 microns. In the above exemplary formulation, Fe-125 was further screened to have an average particle size of less than about 5 microns. Additionally, SM8 alumina was provided as a refractory particulate. However, other suitable refractory and non-refractory particulates many be used, such as CO-210-6 (CoNiCrAlY alloy powder), A16SG alumina, A17SG alumina, calcined alumina, nano-alumina, and combinations thereof, as further described herein.

The anti-corrosive particulates in the above examples each include at least one corrosion resistant particle selected to have a CTE equal to or greater than alumina, in an amount sufficient to provide the coating with a CTE equal to or greater than that of alumina at engine operating temperatures. Such particulates can be any refractory oxide, nitride, metal or alloy having a CTE greater than that of alumina. Preferably, the non-refractory corrosion resistant particulate is an iron-based alloy, nickel-based alloy, a cobalt-based alloy, an MCr, MCrX, MAl, MAlX or MCrAlY, or any combination thereof. One such suitable alloy is CO-210-6, an atomized powder alloy comprised of about 38.5 weight percent cobalt, 32 weight percent nickel, 21 weight percent chromium, 8 weight percent aluminum, and 0.50 weight percent yttrium. CO-210-6 is a designated trade name of, and is commercially available from, Praxair Surface Technologies, Inc. of Indianapolis, Ind., USA. CO-210-6 is further specified as having an agglomerate size distribution (on a cumulative weight basis) of a maximum of about 5 percent below 1.94 microns, about 50 percent between 5 to 7 microns, a minimum of about 95% percent below 16 microns, and 100 percent below 22 microns. However, CO-210-6 and other non-alumina alloys may be provided in a number of different particle size ranges, and also having various weight percentages of the metals falling within the above described broad specification. Additionally, while CO-210-6 is preferred, other alloys having similar CTE characteristics (i.e. CTE characteristics that are not identical to alumina) are also suitable for use in the coating composition of the present invention.

A refractory oxide is also provided as an anti-corrosive particulate in the exemplary compositions. Preferably, the refractory oxide is alumina, and more preferably comprises alumina in at least two particle sizes. Most preferably, the alumina particulate includes a first alumina constituent having number average particle size (diameter) of between 0.05 and 0.8 micrometers, more preferably between 0.10 and 0.6 micrometers, for example, having an average particle size of 0.15 micrometers. A suitable first alumina constituent is commercially available from Baikowski International Corporation under the trademark Baikalox SM8 (hereinafter "SM8") having 99.99 percent $Al_2O_3$, by weight, a specific surface areas BET square meters per gram of 10+/−1, a major phase of alpha, 95 percent major phase, a crystal density of 3.98 grams per square centimeter, a bulk density of 0.93 grams per cubic centimeter, a pressed density of 1.85 grams per cubic centimeter at 2200 psi, and an agglomerate size distribution on a cumulative weight basis of 65 weight percent being less than 0.3 micrometer, 78 percent being less than 0.4 micrometer, 90 percent being less than 0.5 micrometers, 95 percent being less than 0.6 micrometers, and 100 percent being less than 1.0 micrometers, and having about 8 ppm Na, 35 ppm K, 35 ppm Si, 6 ppm V and 3 ppm Ca.

Selection among the various particle sizes, as well as adjusting the weight percentages of the particulates and binder components, will produce slightly different coating properties, such as density and porosity. As previously described, at least part of this effect is the result of physical particle packing, tendency of cracking on drying and curing of the coating, as well as the effect of sintering of any non-ceramic component to form a glass or glassy-ceramic, such as the silicone binder.

Accordingly, in a preferred embodiment, the refractory fraction of the anti-corrosive particulates further includes more than one refractory constituent having a number average particle size (diameter) of less than 25 microns. A suitable second refractory particle product is alumina commercially available from Alcoa under the trade names A16SG and A17SG (hereinafter "A16SG" and "A17SG"). A16SG is a sub-micron alumina, and A17SG is a superground micron-sized alumina, and are reported by the manufacturer as having a low soda content ($NaO_2$ of <0.10 percent), a surface area of about 8.2 or 2.5 $m^2$/g and a median particle size of about 0.48 and 2.9 microns, respectively.

Binder. The binder is preferably a silicone binder, and is more preferably a polymethyl siloxane binder. As previously described, suitable silicone binders include SR350 and SR355 by General Electric Silicones. SR350, for example is a methylsesquisiloxane mixture of the polysiloxane family having a specific gravity of 1.05 to 1.10, a bulk density of 1.02 to 1.14 grams per cubic centimeter, a maximum gel percent of 0.3, and a melt viscosity of 400 to 2000 cps. The silicone resins may be represented by the formula set forth in FIG. 4 of U.S. Pat. No. 6,210,791, which is herein incorporated by reference, wherein R', R, and R" are preferably selected from alkyl groups having 1 to 14 carbon atoms, and are most preferably methyl groups, and n is preferably selected from 1-1000, for example from 1 to 500. SR355 is also classified as methylsesquisiloxane mixture of the polysiloxane family.

Solvent. The solvent comprises an alcohol such as methanol, ethanol, propanol, or combination thereof, although other polar organic solvents such as acetone or trichloroethylene could additionally or alternatively be used. More preferably, the solvent comprises anhydrous alcohol. Most preferably, the solvent comprises about 95 weight percent ethyl alcohol and about 5 weight percent isopropyl alcohol.

Surfactants. Surfactants are optionally included. A suitable surfactant is that commercially available surfactant marketed as PS21A Whitco Chemical. PS21A is specified as an alkyl organic phosphate ester acid surfactant by the manufacturer, and is believed to promote wetting of the alumina particles and/or other refractory particles of the composition. Any surfactants preferably comprise less than 1 weight percent of the composition.

After being sprayed onto a substrate using any suitable sprayer known in the art, the composition can be dried at room temperature and then fired to yield a substantially homogeneous protective coating. Suitable thicknesses for the coating deposited by the spray method are in a range of about 0.1 mil to about 5 mils, and more preferably between about 0.5 mils and 2.5 mils.

The exemplary coating composition of Table 1, designated as Mod 3-4 by the inventors, has been applied and tested on superalloy coupons (RENE® 88DT) with results as shown in FIGS. 4-8. The preferred compositional formula of this first embodiment is as follows: SM8 alumina in the range of about 33 to 40 weight percent, silicone binder such as SR350 in the range of about 25 to about 35 weight percent, ethyl alcohol in the range of about 40 to about 60 weight percent, A17SG alumina at about 45 to about 55 weight percent. However, as earlier stated, it is expected that for the first embodiment of the coating composition, the coating composition may contain by weight from about 5% to about 45% binder, from about 3% to about 50% solvent and from about 15% to about 92% refractory particles by weight and still yield an effective corrosion resistant coating.

Figure 4:
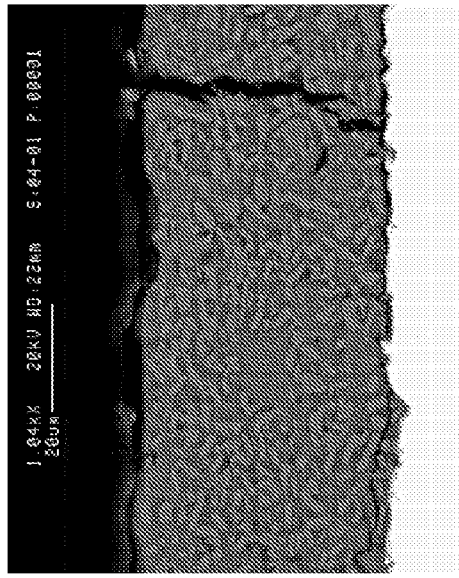
FIG. 4 depicts a superalloy (RENE® 88DT) coupon coated with the first embodiment coating composition of the present invention before cyclic thermal adhesion (FCT) and corrosion testing.
Figure 5:
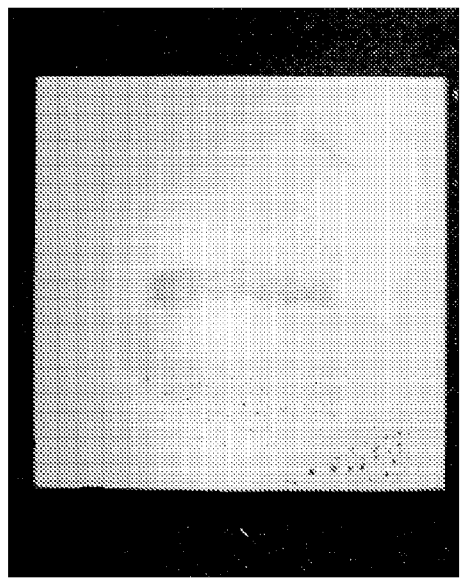
FIG. 5 is a photomicrograph of the coupon of FIG. 5 after cyclic thermal adhesion testing (FCT).

As shown in FIGS. 4-5, the resulting coating composition was sprayed on a RENE® 88 coupon, followed by processing including drying, firing and curing as previously described herein. Curing the composition to form a first coupon resulted in a coating was approximately 3.0 mils thick. As reflected in the micrograph of FIG. 5, that coupon, though not optimized in thickness or porosity to optimize adhesion, completed a Furnace Cycle Testing ("FCT") [FCT cycle is: heating to 1400 F at ~200 F/min, hold at 1400° F. for 45 mins, cool to <500 F at ~200° F./min] of 300 cycles without any separation from the substrate, cracking, or other failure.

Figure 6:
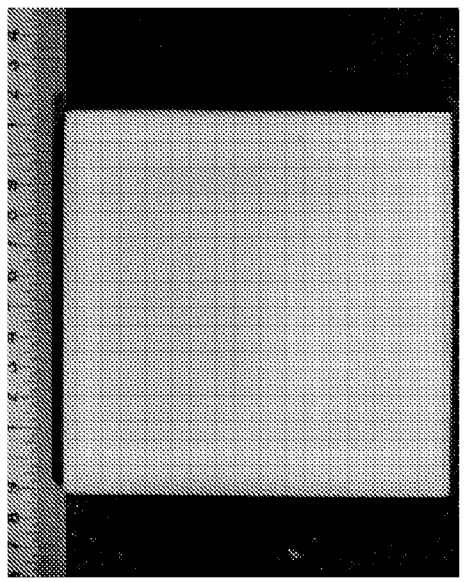
FIG. 6 depicts an exemplary superalloy (RENE® 88DT) coupon coated with the first embodiment of the present invention, shown after corrosion testing.

As further shown in FIG. 6, corrosion testing of a about 1.5 mil coating on the coupon showed no degradation of the coating, and matched the performance of the aforementioned proprietary SermaFlow® N3000 layered paint testing. Corrosion testing was performed (proprietary corrodant made to replicate the corrosive species found in the engine, applied to the surface in a 0.5"×0.125" stripe, exposed to 1300 F for 2 hours, cleaned and inspected=1 test cycle). Both this invention and SermaFlow® N3000 have shown greater than 5× improvement over bare RENE® 88 and are discontinued due to duration and not failure. The coupons were subjected to a rotor corrosion test, with the coating of the present invention yielding an improvement of at least 5 times over uncoated RENE® 88DT and is substantially equivalent to the corrosion protection provided by the SermaFlow® N3000 prior art coating. However, unlike the prior art coating, the coating of the present invention, has a composition free of hexavalent chromium.

Figure 7:
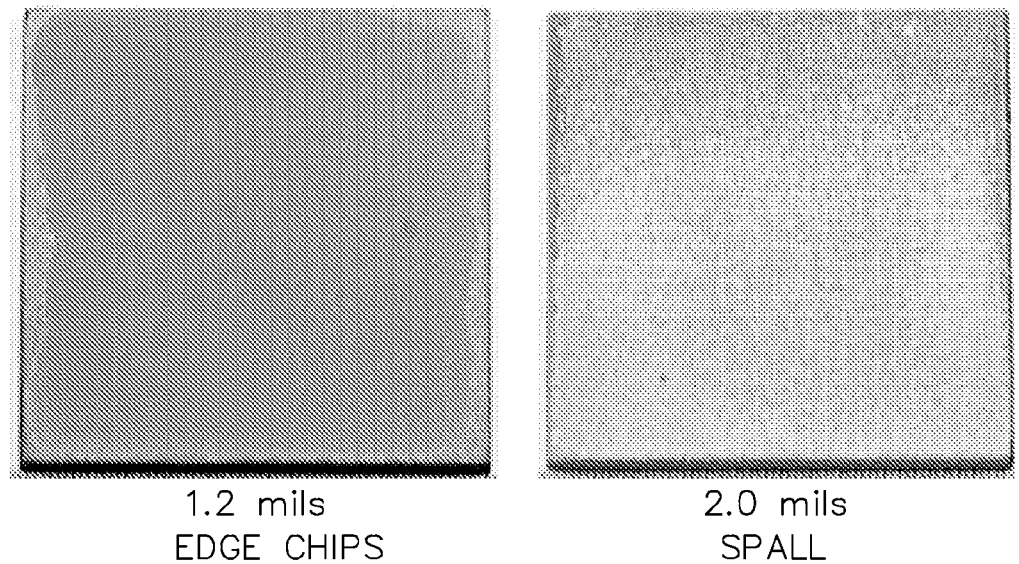
FIG. 7 depicts comparative results of superalloy (RENE® 88DT) coupons coated with the first embodiment of the coating composition versus coupons coated with the SermaFlow® 3000 after cyclic thermal adhesion (FCT) testing.
Figure 7:
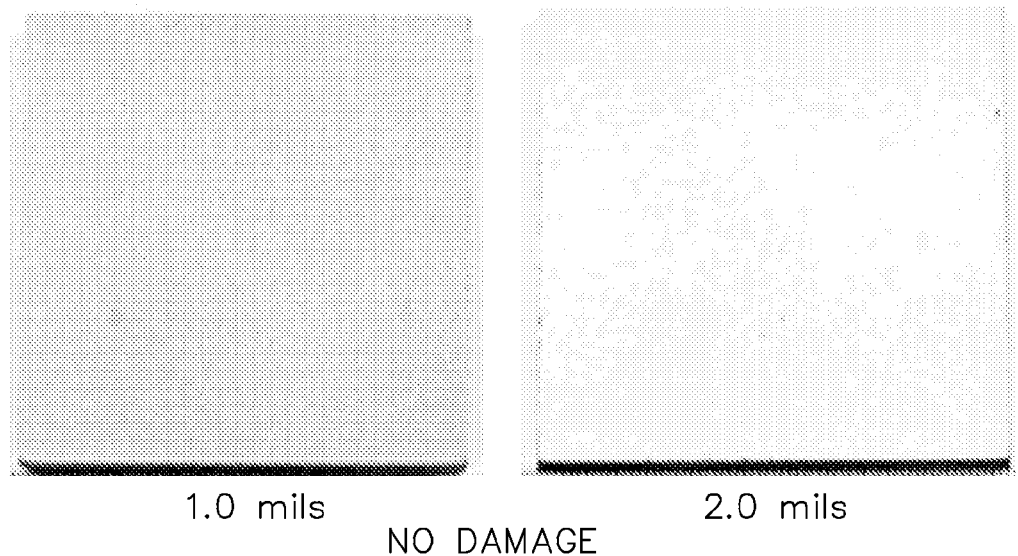

FIG. 7 illustrates the results of two coupons similarly prepared by spraying to yield a coating of approximately 2.0 and approximately 1.0 mils in thickness, respectively. At both thicknesses, the coating of the present invention yielded no damage following FCT. However, coupons prepared using SermaFlow® N3000 of 1 mil and 2 mils in thickness, experienced coating failures including edge chips and spalling, respectively. FCT was conducted at 1400° F. as in the previously described example.

Figure 8:
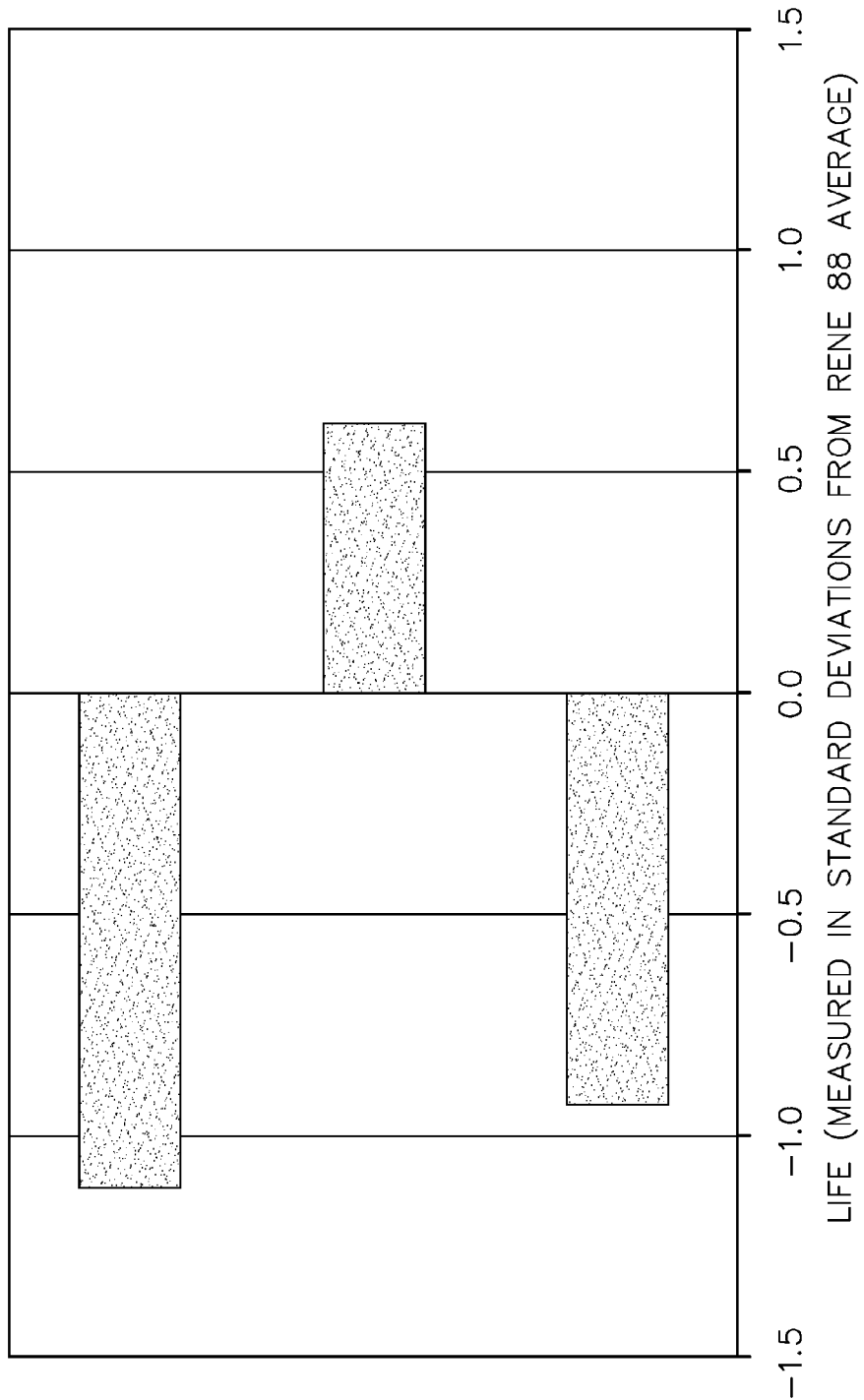
FIG. 8 further graphically depicts the results of low cycle fatigue testing of superalloy (RENE® 88DT) coupons coated with the first embodiment of the coating composition of the present invention.

The exemplary coating designated as Mod#3-4 of the present invention was also tested in low cycle fatigue ("LCF"). LCF test was at 1200° F., 0.78 strain range, with an A-ratio of 1.0 cycled to failure utilizing coating formulation Mod#3-4 of Table 1 at 1-2 mils thickness. As shown in FIG. 8, the results of LCF testing showed lives were approximately equivalent to bare RENE®88DT and the failures initiated outside of the coated zone showing that Mod#3-4 showed no degradation in fatigue life compared with uncoated RENE®88DT.

The exemplary coating composition of Table 2, designated as Mod 8-18 by the inventors, comprises about 20 weight percent SM8 alumina, about 25-35 weight percent SR350 silicone binder, about 45 to about 55 weight percent Ethyl/Isopropyl (95/5) alcohol, and Fe-125 (>5 micron particle size) provided between about 65 to about 75 weight percent. The results of testing and analysis of the applied coating composition in this second embodiment are shown in FIGS. 9-11.

Figures 9, 9A, 9B, 9C:
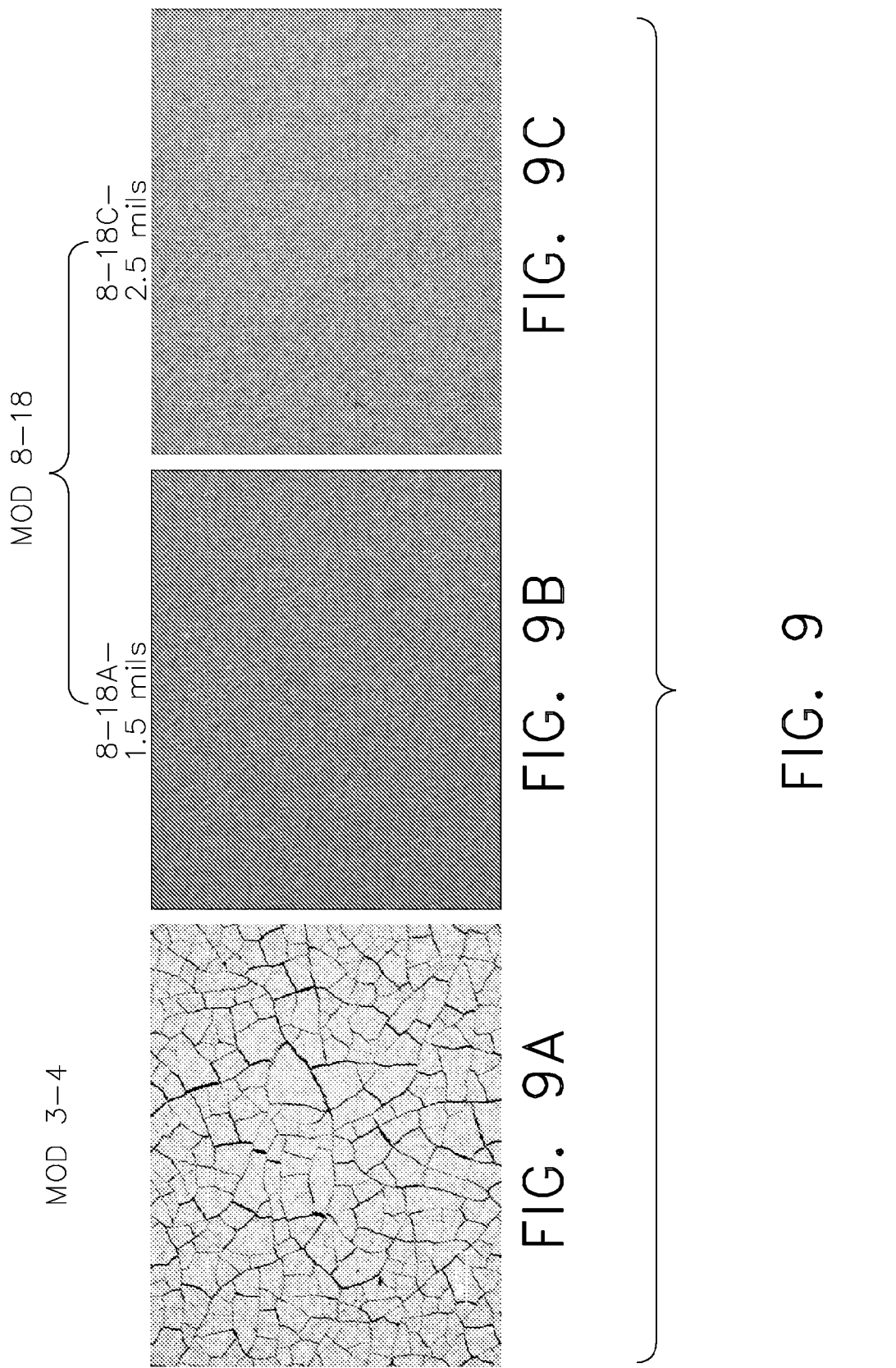
FIGS. 9a-9c depict comparative results of FCT testing of an exemplary coating composition of the first embodiment of the present invention versus an exemplary the coating composition of the second embodiment of the present invention, wherein the CTE of the second composition is selected to closely match that of the superalloy substrate, and wherein two coating thicknesses were provided in the second embodiment.

FIGS. 9a-9c depict comparative results of FCT testing of the exemplary coating composition of the first embodiment designated as Mod #3-4 versus the exemplary coating composition of the second embodiment of the present invention designated as Mod #8-18 at two thicknesses. The CTE of the second composition was selected to closely match that of the superalloy substrate RENE® 88DT. Notably, the Mod #8-18 composition experimented with the ratio of refractory and non-refractory particles, but also thickness as shown by the packing effect of the at least two particle sizes of the corrosion resistant particles illustrated in FIGS. 10-11. As shown in FIG. 9, FCT results of FIGS. 9b-9c show that including a non-refractory, combined with use of at least two particle size ranges, prevents of the craze cracking shown in the Mod 3-4 coated coupon of FIG. 9a. FIGS. 10a and 10b depict cross-sectional photomicrograph views of the coupon of FIG. 9b having Mod 8-18 formulation applied at a thickness of about 1.5 mils, showing particle size distribution and the packing effect resulting from use of at least two particle sizes of corrosion resistant particulates. FIGS. 11a and 11b depict cross-sectional photomicrograph views of the coupon of FIG. 9c having Mod 8-18 formulation applied at a thickness of about 2.5 mils, showing particle size distribution of the corrosion resistant particulates.

The above are exemplary, and are not limiting. Other combinations and variations of ingredients and amounts are within the scope of the invention. Thus, while the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A corrosion resistant coating composition comprising:
    a binder free of hexavalent chromium, the binder comprising silicone, the binder comprising from about 5 to about 45 weight percent of the coating composition;
    a corrosion resistant particulate, the corrosion resistant particulate comprising:
        a refractory particulate having a coefficient of thermal expansion greater than or equal to that of alumina as determined at a temperature of 1200° F., and
        a non-refractory particulate selected from the group consisting of FeAl, CoNiCrAlY, or combinations thereof, the corrosion resistant particulate comprising about 15 to about 92 percent by weight of the composition; and
    a non-aqueous solvent, the solvent comprising from about 3 to about 50 percent by weight of the composition, wherein the corrosion resistant coating has a coefficient of thermal expansion approximately that of an underlying superalloy substrate.

2. The coating composition of claim 1, wherein the refractory particulate is selected from the group consisting of alumina, zironcia, hafnia, yttria stabilized zirconia, yttria stabilized hafnia, ceria, chromia, magnesia, iron oxide, titania, yttria, and yttrium aluminum garnet, and combinations thereof.

3. The coating composition of claim 2, wherein the silicone binder comprises a siloxane.

4. The coating composition of claim 3, wherein the coating composition comprises from about 5 to about 45 weight percent binder, from about 3 to about 50 weight percent solvent, from about 10 to about 87 weight percent non-refractory particles, and from about 5 to about 82 weight percent refractory particles.

5. The coating composition of claim 4, wherein the non-refactory particulate comprises between about 5 to about 10 weight percent cobalt, about 25 to about 40 weight percent nickel, about 15 to about 25 weight percent chromium, about 5 to about 15 weight percent aluminum, and about 0.10 to about 1.5 weight percent yttrium.

6. The coating composition of claim 4, wherein the non-refactory particulate comprises between about 85 to about 95 weight percent iron, and between about 5 to about 15 weight percent aluminum.

7. A coated article comprised of a superalloy substrate and corrosion resistant coating, the article comprising:
    a superalloy substrate; and
    a coating composition applied directly to the superalloy substrate, the coating composition comprising, before curing and firing:
        a binder free of hexavalent chromium, the binder comprising silicone, the binder comprising from about 5 to about 45 weight percent of the composition;
        a corrosion resistant particulate, the corrosion resistant particulate further comprising:
            a refractory particulate having a coefficient of thermal expansion greater than or equal to that of alumina as determined at a temperature of 1200° F., and
            a non-refractory particulate selected from the group consisting of FeAl, CoNiCrAlY, or combinations thereof; the corrosion resistant particulate comprising about 15 to about 92 percent by weight of the composition; and
        a non-aqueous solvent, the solvent comprising from about 3 to about 50 percent by weight of the composition,
    wherein the corrosion resistant coating has a coefficient of thermal expansion approximately that of the superalloy substrate.

8. The coated article of claim 7, wherein the corrosion resistant particulate comprises alumina, zironcia, hafnia, yttria stabilized zirconia, yttria stabilized hafnia, ceria, chromia, magnesia, iron oxide, titania, yttria, and yttrium aluminum garnet, and combinations thereof 9. The coated article of claim 8, wherein the coating composition comprises from about 5 to about 45 weight percent binder, from about 3 to about 50 weight percent solvent, from about 10 to about 87 weight percent non-refractory particles, and from about 5 to about 82 weight percent refractory particles.

10. The coated article of claim 9, wherein the non-refractory particulate comprises between about 5 to about 10 weight percent cobalt, about 25 to about 40 weight percent nickel, about 15 to about 25 weight percent chromium, about 5 to about 15 weight percent aluminum, and about 0.10 to about 1.5 weight percent yttrium.

11. The coated article of claim 9, wherein the non-refractory particulate comprises between about 85 to about 95 weight percent iron, and between about 5 to about 15 weight percent aluminum.

12. A coated article comprised of a superalloy substrate and corrosion resistant coating, the article comprising:
    a superalloy substrate having an outer surface, the outer surface having a first corrosion resistant coating thereon, wherein the first corrosion resistant coating has a coefficient of thermal expansion approximately that of the superalloy substrate; and
    a coating composition overlying the first corrosion resistant coating, the coating composition comprising, before curing and firing:
        a binder free of hexavalent chromium, the binder comprising silicone, the binder comprising from about 5 to about 45 weight percent of the composition;
        a corrosion resistant particulate, the corrosion resistant particulate comprising:
            a refractory particulate having a coefficient of thermal expansion greater than or equal to that of alumina as determined at a temperature of 1200° F., and
            a non-refractory particulate selected from the group consisting of FeAl, CoNiCrAlY, or combinations thereof; the corrosion resistant particulate comprising about 15 to about 92 percent by weight of the composition; and
        a non-aqueous solvent, the solvent comprising from about 3 to about 50 percent by weight of the composition,
    wherein the coating composition has a coefficient of thermal expansion approximately that of the superalloy substrate.

13. The coated article of claim 12, wherein the first corrosion resistant coating is selected from the group consisting of MCrAlX coatings, aluminides, and noble metal-modified aluminides.

14. A coated article comprised of a superalloy substrate and corrosion resistant coating, the article comprising:
    a superalloy substrate; and
    a coating applied directly to the superalloy substrate, the coating comprising:

a binder free of hexavalent chromium, the binder comprising silicone, the binder comprising from about 5 to about 75 weight percent of the coating; and a corrosion resistant particulate, the corrosion resistant particulate comprising:

a refractory particulate having a coefficient of thermal expansion greater than or equal to that of alumina as determined at a temperature of 1200° F., and a non-refractory particulate selected from the group consisting of FeAl, CoNiCrAlY, or combinations thereof, the corrosion resistant particulate comprising about 25 to about 95 percent by weight of the coating, wherein the coating has a coefficient of thermal expansion approximately that of the superalloy substrate.

15. The coated article of claim 14, wherein the binder forms a glass matrix upon heating to a first preselected temperature and wherein the corrosion resistant particles are substantially uniformly distributed in the matrix.

16. The coated article of claim 15, wherein the binder forms a glassy ceramic matrix upon heating to a second preselected temperature, the second preselected temperature being greater than the first preselected temperature.

17. A coated article comprised of a superalloy substrate and corrosion resistant coating, the article comprising:

a superalloy substrate having an outer surface, the outer surface having a first corrosion resistant coating thereon, wherein the first corrosion resistant coating has a coefficient of thermal expansion approximately that of the superalloy substrate; and a second coating overlying the first corrosion resistant coating, the second coating comprising:

a binder free of hexavalent chromium, the binder comprising silicone, the binder comprising from about 5 to about 75 weight percent of the second coating; and a corrosion resistant particulate, the corrosion resistant particulate comprising:

a refractory particulate having a coefficient of thermal expansion greater than or equal to that of alumina as determined at a temperature of 1200° F., and a non-refractory particulate selected from the group consisting of FeAl, CoNiCrAlY, or combinations thereof, the corrosion resistant particulate comprising about 25 to about 95 percent by weight of the second coating, wherein the second coating has a coefficient of thermal expansion approximately that of the superalloy substrate.

18. The coated article of claim 17, wherein the binder forms a glass matrix upon heating to a first preselected temperature and wherein the corrosion resistant particles are substantially uniformly distributed in the matrix.

19. The coated article of claim 18, wherein the binder forms a glassy ceramic matrix upon heating to a second preselected temperature, the second preselected temperature being greater than the first preselected temperature.

* * * * *